United States Patent [19]

Hopson, Jr. et al.

[11] Patent Number: 5,158,801
[45] Date of Patent: Oct. 27, 1992

[54] METHOD OF FORMING A MULTIPLE LAYER DIELECTRIC AND A HOT FILM SENSOR THEREWITH

[75] Inventors: Purnell Hopson, Jr., Seaford; Sang Q. Tran, Hampton, both of Va.

[73] Assignee: The United States of America as represented by the United States Administrator of the National Aeronautics and Space Administration, Washington, D.C.

[21] Appl. No.: 688,361

[22] Filed: Apr. 15, 1991

Related U.S. Application Data

[60] Continuation of Ser. No. 458,214, Dec. 28, 1989, abandoned, which is a division of Ser. No. 176,547, Apr. 1, 1988, Pat. No. 4,917,940.

[51] Int. Cl.$^5$ .............................................. C23C 14/00
[52] U.S. Cl. ........................................ 427/58; 427/255; 427/344; 427/527; 427/255.7; 427/248.1; 427/255.6
[58] Field of Search ............... 427/58, 344, 255, 40, 427/255.7, 248.1, 255.6

[56] References Cited

U.S. PATENT DOCUMENTS

| | | | |
|---|---|---|---|
| 3,864,202 | 2/1975 | Loeb | 428/337 |
| 4,057,661 | 11/1977 | Züst | 427/255 |
| 4,321,299 | 3/1982 | Frazer | 427/255.5 |
| 4,360,820 | 11/1982 | Forster | 427/255.6 |
| 4,673,628 | 6/1987 | Inoue | 430/66 |
| 4,701,394 | 10/1987 | Inoue | 430/95 |
| 4,784,881 | 11/1988 | Fiore | 427/255 |
| 4,828,870 | 5/1989 | Ando | 427/255 |
| 4,917,940 | 4/1990 | Hopson | 428/216 |

FOREIGN PATENT DOCUMENTS

| | | | |
|---|---|---|---|
| 214971 | 10/1984 | Fed. Rep. of Germany | 427/255 |
| 25220 | 3/1981 | Japan | 427/255 |
| 3112632 | 5/1988 | Japan | 427/344 |

Primary Examiner—Shrive Beck
Assistant Examiner—Vi Duong Dang
Attorney, Agent, or Firm—Kevin B. Osborne

[57] ABSTRACT

The invention is a method of forming a multiple layer dielectric for use in a hot-film laminar separation sensor 21. The multiple layer dielectric substrate is formed by depositing a first layer 22 of a thermoplastic polymer such as on an electrically conductive substrate such as the metal surface 23 of a model 24 to be tested under cryogenic conditions and high Reynolds numbers. Next, a second dielectric layer 26 of fused silica is formed on the first dielectric layer 22 of thermoplastic polymer. A resistive metal film is deposited on selected areas of the multiple layer dielectric substrate to form one or more hot-film sensor elements 27 to which aluminum electrical circuits 28 deposited upon the multiple layered dielectric substrate are connected.

7 Claims, 4 Drawing Sheets

METHOD OF FORMING A MULTIPLE LAYER DIELECTRIC AND A HOT FILM SENSOR THEREWITH

ORIGIN OF THE INVENTION

The invention described herein was made by employees of the United States Government and may be manufactured and used by or for the Government for governmental purposes without the payment of any royalties thereon or therefor.

This is a continuation of copending application Ser. No. 07/458,214 filed on Dec. 28, 1989, abandoned which is a division of Ser. No. 07/176,547, filed Apr. 1, 1988, now U.S. Pat. No. 4,917,940, issued Apr. 17, 1990.

BACKGROUND OF THE INVENTION

1. Field of the Invention

The invention is a method of forming a multiple layer dielectric and a hot-film sensor formed therewith, more particularly a hot-film laminar flow separation sensor for use in continuous, high pressure cryogenic wind tunnels under high Reynolds numbers such as the National Transonic Facility (NTF) at Langley Research Center, Hampton, Va.

2. Description of the Prior Art

Various types of hot film sensors for use in ambient temperature subsonic and transonic wind tunnels and in cryogenic facilities are known. Hot-film sensors are generally preferred over hot-wire, surface pitot tubes and other known systems for detecting the beginning and end of boundary layer transition on models tested in conventional (near ambient) temperature and pressure wind tunnels.

However, conventional hot-film sensors of the quartz plug type are unsuited for use in cryogenic wind tunnels because of the wide range of temperatures (ambient to cryogenic) and the high Reynolds numbers (i.e., 3.0–10.5 million) encountered during testing.

This is because the wide range of tunnel temperature causes a differential growth between the hot-film installation and the electrically conductive surface of the test model to which attached. This differential growth can lead to surface roughness that exceeds the critical roughness height at the normal high unit Reynolds numbers developed in continuous high pressure cryogenic tunnels such as the NTF causing an undesirable and misleading boundary layer transition.

It is frequently required to test models having a wing span of four to five feet. Such tests can require one hundred or more hot-film laminar separation sensors to adequately locate the boundary layer transition on-line over a wide range of model attitudes (i.e., angle of attack and yaw) and test conditions (i.e., Mach number and Reynolds number) that are encountered in a typical force and moment test in a wind tunnel such as the NTF.

Conventional hot-film sensors formed by the vapor deposition of a metallic and resistive film and gold connecting leads upon a dielectric substrate such as an epoxy paint applied to the metal surface of the wing to be tested have not proved successful for use in a continuous high pressure cryogenic environment. One reason is that the resulting thickness of such hot-film sensors is frequently in excess of 0.006 inches which exceeds the permissible critical roughness height. Due to the large surface area required to form such hot-film sensors, center to center spacing is greater than 0.125 inches.

In addition, such epoxy paint substrates are extremely difficult to smooth down in thickness without effecting the surrounding surface area of the model to which attached; have a tendency to fail at cryogenic temperatures; and are not of sufficient flexibility for use on two and three dimensional surfaces as found on many test models.

Other systems for sensing laminar separation using flow visualization, infrared thermography, and fluctuating surface pressures are known, but have been found either intrusive or inadequate for use in NTF operating conditions.

SUMMARY OF THE INVENTION

An object of the invention is to provide a method of forming a multiple layer dielectric and a hot-film sensor formed therewith for sensing laminar separation over the electrically conductive surface of a test model in a continuous high pressure cryogenic wind tunnel under the high Reynolds numbers.

Another object of the invention is to provide a method of forming and a hot-film laminar separation sensor formed thereby having no significant surface roughness when attached to the surface of a model tested in a continuous high pressure cryogenic wind tunnel.

Yet another object is to provide a method of forming and a hot-film sensor formed thereby of a multiple layer dielectric substrate having a metallized film thereon and less than 0.001 inches in thickness.

The above and numerous other objects are achieved by a method of the invention which generally includes the steps of: depositing a coating of a thermoplastic polymer on a selected surface area such as by vapor deposition; bombarding the coating with an ion beam gun while evaporating a layer of fused silica thereon to form a multiple layer dielectric useful for numerous applications other than in a hot-film sensor. To form the latter, a resistive metal film may be formed on the multiple layer dielectric substrate as by vapor deposition.

Hot-film sensors for use on the surface of test models of different materials and formed by the method of the invention may include a multiple layer dielectric substrate on a metal model surface formed of a first layer of a thermoplastic polymer 3–5 or more microns in thickness and a second layer of fused silica 0.5–1.0 or more microns in thickness though both dimensions may be selectively varied to meet any required critical roughness height for the test conditions employed.

The metal film on the multiple layer dielectric substrate may be of platinum, palladium, nickel or the like. Suitable connecting electrical circuits of a vapor deposited film of metal such as aluminum or the like are formed on the multiple layer dielectric substrate, the thickness of which may be varied depending upon the desired resistance for any given application.

The resulting hot-film sensors may be arranged in arrays on two or three dimensional model test surfaces. The metal film connecting leads are brought out to the edge of the model test surface and attached to surface level connecting pins which may in turn be connected to a suitable data acquisition system.

BRIEF DESCRIPTION OF THE PRIOR ART

Figure 1:
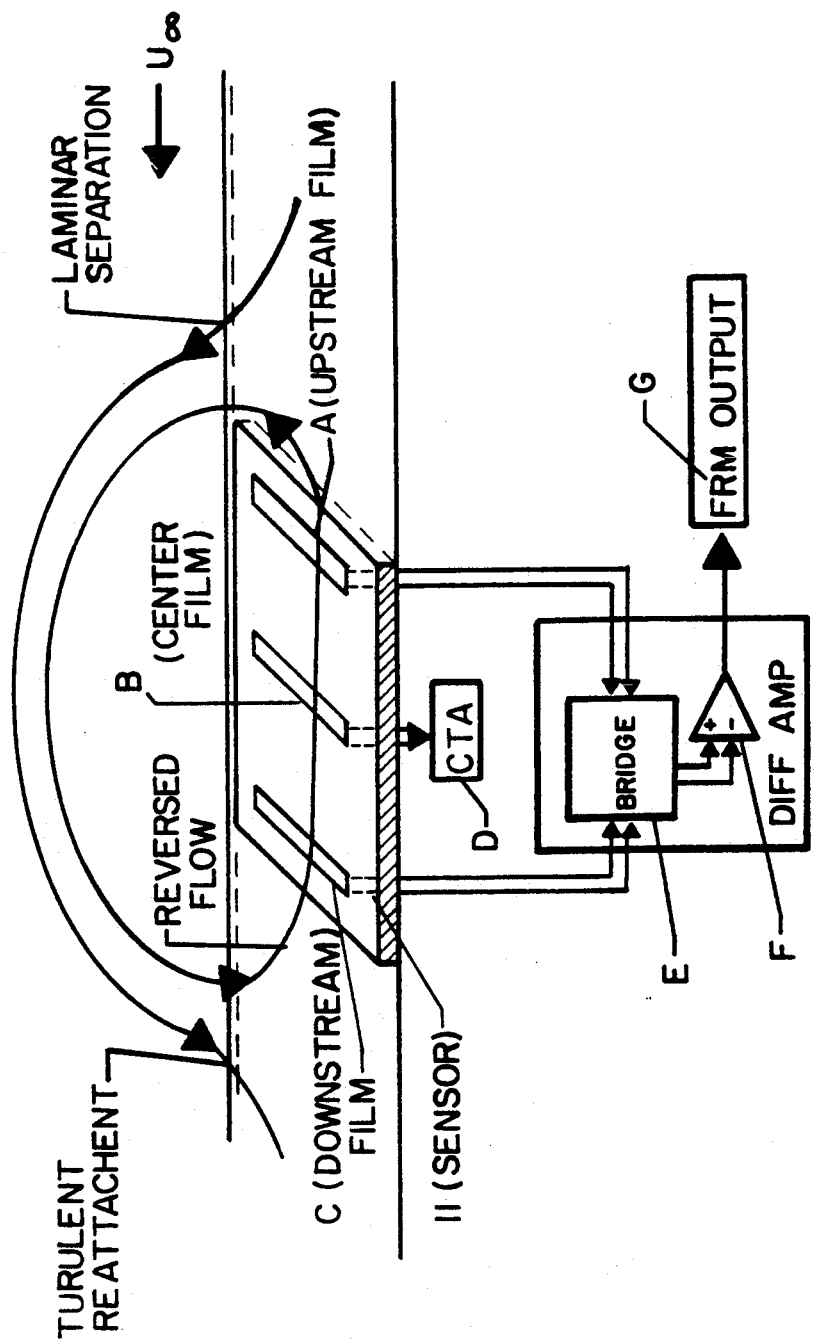
FIG. 1 is a schematic illustrating the principle of operation of a hot-film laminar separation sensor.

Referring to the drawings, FIG. 1 illustrates a conventional, prior art hot-film laminar separation sensor and its principles of operation. As shown, the operation is based upon the known phenomena that the air flow over a test model surface recirculates causing a flow reversal in the resulting laminar bubble. The sensor designated generally by the reference numeral 11 includes an array of three spaced, parallel hot-film sensor elements oriented perpendicularly to the freestream air flow (11) and are identified as upstream, center, and downstream hot-film sensor elements B, B, and C, respectively.

The center sensor film element A may be heated by a constant temperature anemometer D which acts as a conventional hot-film transition sensor. The upstream and downstream hot-film sensor elements A and C are connected into two legs of a differential bridge amplifier circuit E and act as resistance thermometers. During testing, when the hot-film sensor elements A, B, and C are exposed to the airstream (U), heat is transferred from the center hot-film sensor element B to either the upstream A or downstream B hot-film sensor element depending upon the direction of air flow over the surface of the center hot-film sensor element B. The resulting temperature difference between the upstream and downstream hot-film sensor elements A and C, the resistances of which are temperature responsive, is measured by the bridge E and a high gain differential amplifier F.

The polarity of the output signal from the differential amplifier which indicates the direction of air flow is monitored by a flow reversal meter (FRM) G.

Figure 2:
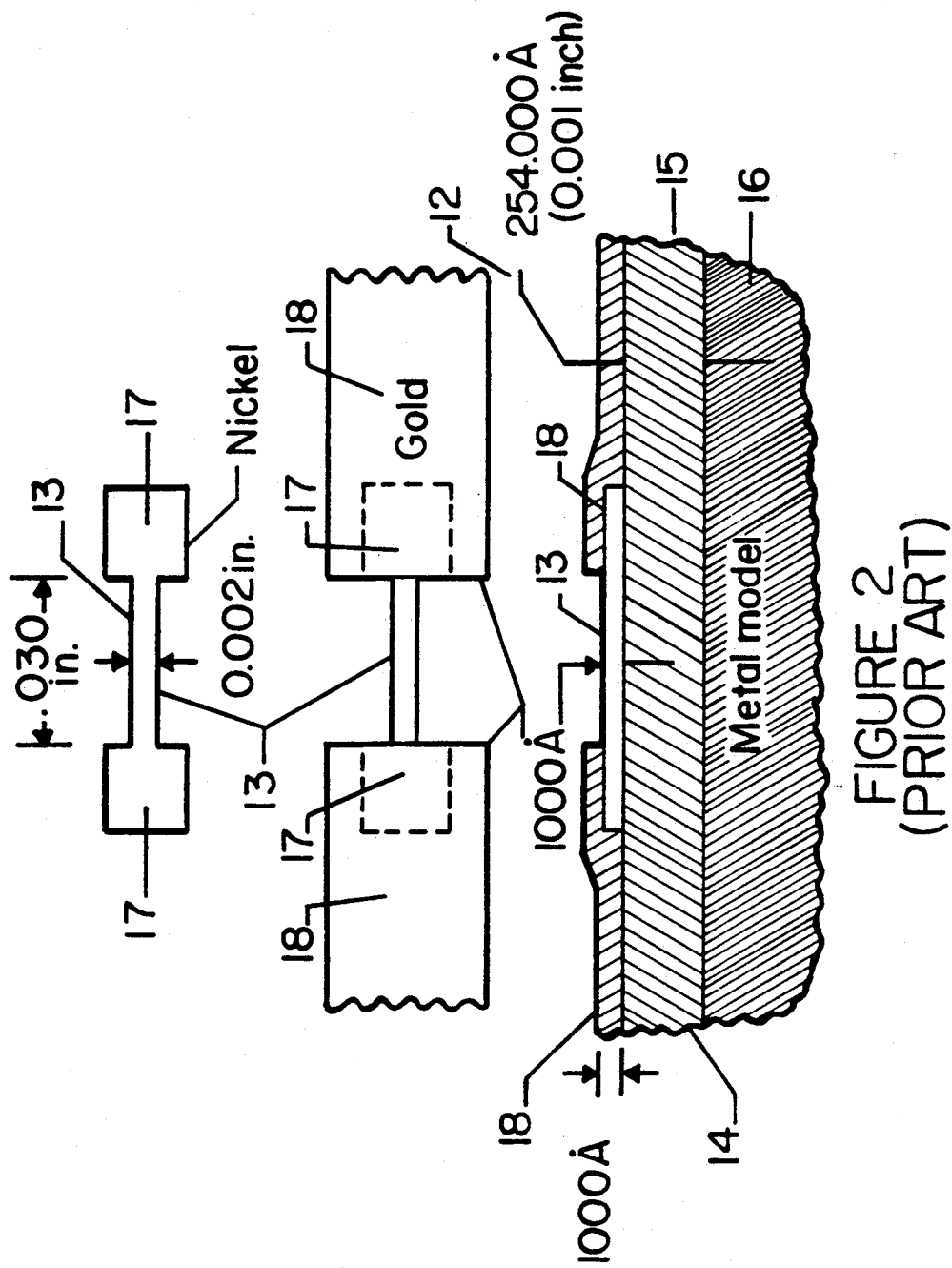
FIG. 2 is an exploded cross-sectional view illustrating a prior art hot-film laminar separation sensor.

Typically, each of the prior art upstream, center and downstream hot-film sensors A, B, and C forming a conventional array are formed as shown in FIG. 2. Each hot-film sensor element hereinafter designated by the reference number 12 includes a metallic film 13 of nickel or the like the resistance of which varies with temperature that is vapor deposited upon a dielectric substrate 14 such as an epoxy paint approximately 0.001 inch in thickness. The epoxy paint is applied directly to the metal surface 15 of a test model 16.

Each hot-film sensor element 12 may include such a nickel conductor film 13 that is 0.030 inch in length, 0.002 inch in width, and approximately 1000 Å in thickness integrally formed between enlarged, square-shaped conductive end pads 17. Transparent gold connectors 18 of the same thickness as the hot-film sensor element 13 are vapor deposited on the epoxy paint forming the dielectric substrate 14 and the end pads 17. While tests on prior art hot-film sensors 12 such as shown in FIG. 2 may operate at cryogenic conditions such as found in the NTF, they are not reliably capable of detecting laminar transition in the NTF in a real-time mode due to the breakdown of the dielectric substrate.

Because of the excessive failure rate of such early conventional hot-film sensors 12, improvements in the method of forming the sensors is required, particularly in the physical properties and thickness of the dielectric substrate 14 and the metalization procedure used to form the hot-film element 13 and connectors 18.

A particular limitation of the prior art hot-film sensor 12 was found to be its excessive overall thickness which exceeds the critical roughness height at the high unit Reynolds numbers to which subjected in the NTF inducing boundary layer transition.

Further, because of excessive dielectric substrate failures due to the cracking of epoxy paint and other known polyimide materials used as dielectric substrates, it was found that they cannot be reliably used on curved shapes such as the leading edge of wings because of their camber, twist, sweep, and winglets. It is believed this is because of the inflexible nature of such dielectric substrates which causes them to split and crack under cryogenic test conditions when applied to curved metal test surfaces.

BRIEF DESCRIPTION OF A PREFERRED EMBODIMENT OF THE INVENTION

Figure 3:
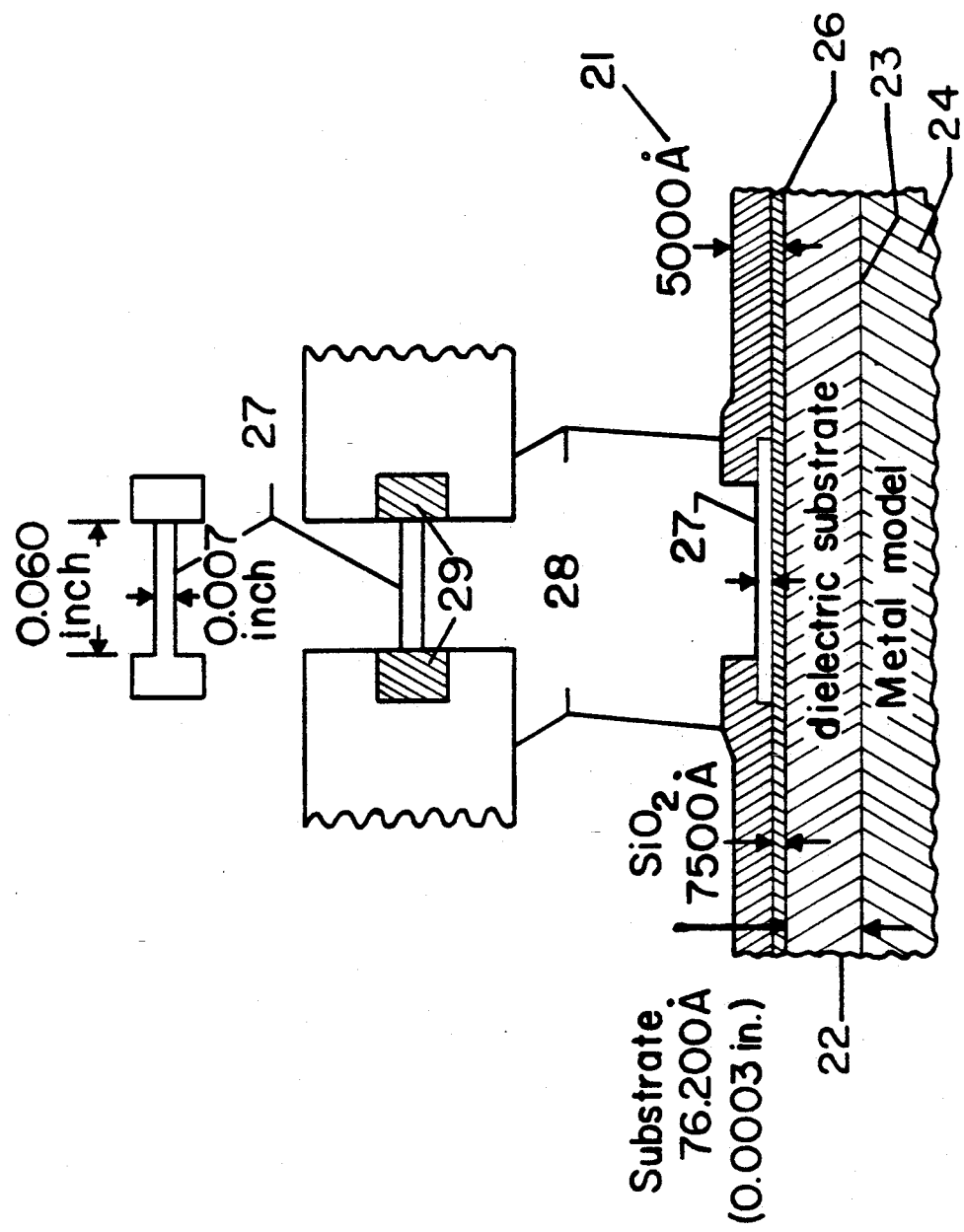
FIG. 3 is an exploded, cross-sectional view of a preferred hot-film laminar sensor in accordance with this invention.

FIG. 3 illustrates a preferred embodiment of a hot-film sensor generally designated by the reference numeral 21 formed in accordance with a preferred method of the invention which includes yet an additional novel method of forming novel multiple layer dielectric coatings for use in numerous applications in addition to hot-film laminar flow separation sensors.

Figure 4:
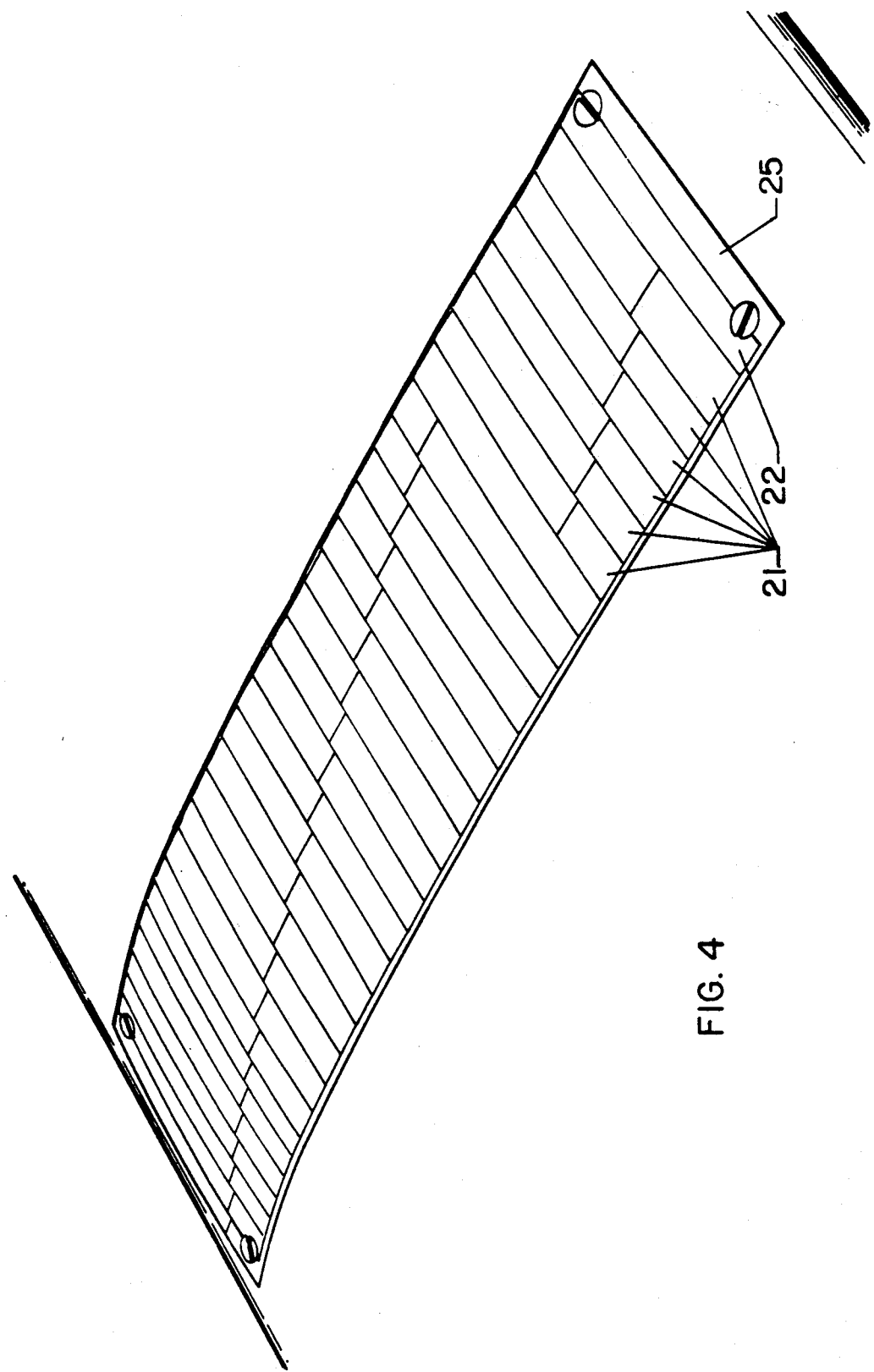
FIG. 4 is a perspective of a 2-D airfoil with an array of hot-film laminar sensors in accordance with the invention formed as a metallic insert mounted in the airfoil.

The method of forming the hot-film sensor 21 as shown in FIG. 3 comprises the steps of: first applying a dielectric substrate 22 of a suitable thermoplastic polymer polyimide such as Parylene C manufactured by the Union Carbide Corporation, by vapor phase polymerization deposition to a selected area on the electrically conductive surface 23 of a model 24 to be tested or upon the selected area of the metal surface of an array of such sensors 21 formed on a separate panel 25 (FIG. 4) to be attached to the surface of a model 24 to be tested;

second, forming, as by evaporating, a coating 26 of fused silica ($S_iO_2$) as by means of an electron gun over the dielectric substrate 22 while bombarding the dielectric substrate 22 with an ion beam gun;

third forming as by vapor deposition a metal hot-film sensor element 27 of platinum, palladium, nickel or nickel chrome directly on selected areas of the resulting multiple layer dielectric coating formed by steps one and two; and four, forming as by vapor deposition, metallic film electrical connectors 28 of aluminum or the like directly over the end pads 29 of the hot-film 27 and the fused silica coating 26.

Typically, the thermoplastic dielectric layer 22 may be 3-5 or more microns thick and the dielectric fused silica ($S_iO_2$) layer 26 is 0.5-1.0 or more microns thick though these thicknesses may be varied to meet the required critical roughness height of the completed sensor 21 as determined by the cryogenic conditions in which sensing is to take place.

Parylene C, a commercially available thermoplastic polymer, has been discovered to serve as an excellent dielectric substrate for use in hot-film sensors 21 because of its electrical and mechanical properties. It is one of a series of thermoplastic polymers known as parylenes which are capable of being produced as thin films by vapor phase polymerization in continuous, conformal coatings on metal substrates in thicknesses of 1000 Å to 5 microns or more.

A basic member of the series is poly-para-xylylene, a completely linear, highly crystalline material which, when modified by substituting a chlorine atom for one of the hydrogen atoms on the ring, forms Parylene C (poly-monochloro-para-xylylene), a somewhat less crystalline material having better clarity and barrier properties, low gas permeability, low moisture vapor transmissions, and low temperature ductility.

The deposition rate for such thermoplastic polymers may range from about 0.5 microns per minute (about 0.02 mil) up to 1.0 mil per minute on cooled substrates and may be used when so applied to a test model at both elevated and cryogenic temperatures.

Further, it has been found, this series of parylene polymers can be deposited uniformly and substantially pin hole free from a vapor over a large, curved surface area such as a wing to form a continuous conforming dielectric substrate of accurately controlled thickness.

While Parylene C (poly-monochloro-para-xylylene) has been found to have a high elongation-to-break percentage permitting it to accommodate the thermal coefficient of expansion of adjacent materials such as the metal model surface to which applied, it does not serve as an acceptable dielectric substrate for vapor deposited metal films when used in conventional hot-film sensors 12

The reason, it was discovered, is that the metals, when vapor deposited, have intrinsic stresses in the resulting metal film 27. The surface of a dielectric substrate 22 of the parylene series such as Parylene C yields to the film stress at the metal interface. This can cause fractures in the metal hot-film preventing their use as accurate, temperature responsive sensors.

It was discovered, in accordance to the method of this invention, that these limitations can be overcome by incorporating a stable oxide buffer 26 between the thermoplastic polymer dielectric substrate layer 22 and the metal hot-film sensor 27. $SiO_2$ has been found to provide such a buffer as it is very stable, both thermally and chemically, and can also be easily vapor deposited to the required and selective thickness.

By practicing the method of this invention, a hot-film laminar separation sensor 21 for use in cryogenic conditions may be provided having no significant surface roughness; no effect on the test surface conditions; that can be formed on complex surface contours such as wing leading and trailing edges; that is compatible with cryogenic temperature test conditions; and of excellent mechanical durability.

As previously described metal electrical leads 28 are also deposited directly onto the connector pads 29 of the hot-film sensor 27 and layer of fused $SiO_2$ 26. It has been discovered that aluminum is preferably used for the electrical leads 28 rather than gold for instance as aluminum adheres much better than gold to the $SiO_2$ layer while having virtually the same electrical properties as gold from ambient to cryogenic temperatures.

A system for depositing the thermoplastic polymer dielectric substrate layer 22 such as Parylene C may consist basically of a vaporizer; a pyrolysis zone; a model deposition chamber; and a vacuum system. A metalization/deposition system may consist basically of a chamber deposition control console, a vacuum system, and a deposition chamber.

The main internal components of the metalization/deposition chamber are an ion beam generator and an electron beam generator. The ion beam generator is used to enhance the surface adhesion properties of the previously deposited dielectric substrate on the surface 23 of the model 24 or panel 25. During this time an intitial portion of layer 26 of fused silica ($SiO_2$) is simultaneously vapor deposited on the enhanced surface of the dielectric layer 22 to prevent unwanted contamination. Thereafter, the ion beam generator is de-energized and the electron beam generator remains activated to continue the vapor deposition of the fused silica ($SiO_2$) until the layer 26 is of the desired total thickness. The vapor deposition rate of the fused silica ($SiO_2$) may be varied as desired after the ion beam generator has been de-energized.

While a preferred method of forming a multiple layer dielectric substrate for use in forming a hot-film sensor 21 such as a laminar separation sensor for use in continuous, high pressure cryogenic wind tunnels has been described in detail, it is understood numerous changes and modifications can be made within the principles of the invention which is to be limited only by the scope of the appended claims.

What is claimed:

1. A method of forming a multiple layer dielectric on a metal substrate comprising the steps of:
   forming a first layer of a thermoplastic polymer including a base member of poly-para-xylylene directly upon said metal substrate; and
   simultaneously bombarding said layer of thermoplastic polymer with a ion beam while forming a layer of fused silica $SiO_2$ thereon to form said multiple layer dielectric, the layer of $SiO_2$ serving as a chemically and thermally stable buffer between said thermoplastic polymer layer and a subsequently added metal layer.

2. The method of claim 1 including the subsequent step of forming a temperature responsive electrically resistive metal film directly on selected areas of said multiple layer dielectric to form a hot-film sensor.

3. The method of claim 1 wherein said layer of thermoplastic polymer is formed by vapor deposition and said layer of fused silica is formed by evaporation.

4. The method of claim 1 wherein said layer of thermoplastic polymer is formed on said substrate by vapor phase polymerization.

5. The method of claim 2 wherein said electrically resistive metal film is formed directly upon said multiple layer dielectric by vapor deposition and including the further step of vapor depositing metallic film electrical connectors on portions of said resistive metal film and said multiple layer dielectric.

6. The method of claim 1 wherein said first layer of thermoplastic polymer is formed of a coating of poly-monochloro-para-xylylene.

7. The method of claim 5 wherein said first layer of thermoplastic polymer is formed of a coating of poly-monochloro-para-xylylene up to 5.0 microns in thickness;
   said second layer of fused silica is up to 1.0 micros in thickness;
   said electrically resistive metal film is formed of resistive nickel-chrome film up to 2200 Å in thickness; and
   said electrical connectors are formed of aluminum up to 5000 Å in thickness.

* * * * *